Aug. 25, 1970 — C. V. BERGER — 3,525,776

ALKYLATION-DEHYDROGENATION PROCESS

Filed Nov. 12, 1968

INVENTOR:
Charles V. Berger

BY: James R. Hoatson, Jr.
Robert W. Erickson
ATTORNEYS

United States Patent Office 3,525,776
Patented Aug. 25, 1970

3,525,776
ALKYLATION-DEHYDROGENATION PROCESS
Charles V. Berger, Western Springs, Ill., assignor to Universal Oil Products Company, Des Plaines, Ill., a corporation of Delaware
Filed Nov. 12, 1968, Ser. No. 774,684
Int. Cl. C07c 3/50, 5/18, 15/10
U.S. Cl. 260—669                                3 Claims

ABSTRACT OF THE DISCLOSURE

A process for alkylating an alkylatable aromatic hydrocarbon and steam dehydrogenating the resultant alkylated aromatic to form an alkenyl aromatic hydrocarbon having an alkenyl group containing at least two carbon atoms in which the saturate-containing unalkylated alkylatable aromatic hydrocarbon withdrawn as a purge from the alkylation zone is recovered and purified in the dehydrogenation zone. This process is especially adaptable to the production of styrene from ethylene and benzene.

BACKGROUND OF THE INVENTION

This invention relates to a process for the production of an alkenyl aromatic hydrocarbon containing an alkenyl group of at least two carbon atoms. Specifically, it relates to a process for the alkylation of an alkylatable aromatic hydrocarbon with an olefin-acting compound, in particular, an olefinic hydrocarbon to form a monoalkylated aromatic, and the steam dehydrogenation of the monoalkylated aromatic to yield an alkenyl group of at least two carbon atoms. More specifically, this invention relates to the alkylation of benzene with ethylene to form ethylbenzene and dehydrogenating the resultant ethylbenzene to form styrene. In particular, this invention relates to the recovery of the unreacted alkylatable aromatic hydrocarbon withdrawn from the alkylation zone as a purge to control the saturated hydrocarbon level within the alkylation zone.

Processes for the production and synthesis of alkenyl aromatics have gained considerable importance because the demand for alkyl aromatics, as starting materials in the manufacture of a multitude of resins, plastics, elastomers, etc., has exceeded the natural occurring supply recovered from coal tars and crude oils. For example, styrene, a product which may be manufactured in the present process, is in widespread demand as a polymer starting material. One of the principal uses involves the copolymerization of the styrene with butadiene to form high molecular weight "Buna-S" rubber. Similarly, other polymeric materials may be made by the polymerization of styrene with itself or by copolymerization with isoprene, acrylonitrile, vinyl chloride, etc.

It is recognized that the production of alkenyl aromatics is well known within the prior art, both with respect to alkylation and dehydrogenation processes and the varieties of catalytic composites employed therein. For example, ethylbenzene is produced by, (1) alkylating benzene with ethylene in the presence of a catalyst material such as boron trifluoride in an alkylation reaction zone; (2) commingling the effluent with the effluent from a transalkylation zone hereinafter described; (3) separating, from the resultant mixture, normally gaseous hydrocarbons, unreacted benzene, ethylbenzene and polyethylbenzenes; (4) recycling at least a portion of the unreacted benzene to the alkylation zone; (5) withdrawing a portion of said unreacted benzene as a purge, and removing ethylbenzene as product; (6) passing the polyethylbenzenes in admixture with benzene to a transalkylation zone; (7) reacting this mixture in the presence of a transalkylation catalyst such as boron trifluoride to form ethylbenzene from the polyethylbenzene-benzene mixture; and (8) commingling the effluent with the effluent from the alkylation step as hereinbefore set forth. The purge of unreacted benzene affords a measure of control on the level of saturated hydrocarbons within the process. These saturates are not only formed within the process to some extent, but are also introduced into the process as impurities within the feed benzene and, if not removed, will build up within the reactor system and act as a diluent, thereby lowering over-all process efficiency. Unfortunately, this benzene is not returned to the alkylation process since it cannot be readily separated from the saturates by conventional distillation techniques because of the similarity in relative volatiles existing between the compounds and further, the small amount of purge being withdrawn does not justify the installation of an aromatic extraction unit utilizing extractive agents such as sulfolane, glycol, etc. This results in the benzene being used for lesser-valued operations such as gasoline blending thus, lowering the ultimate over-all ethylbenzene yield from the alkylation reaction.

Styrene is produced by passing a mixture of ethylbenzene and steam over a fixed bed dehydrogenation catalyst maintained at elevated temperatures, the steam being present to provide the requisite amount of heat required for the endothermic reaction, to maintain catalyst activity, and to lower the ethylbenzene partial pressure within the reaction zone. Regardless of the catalyst employed, many such processes admix the ethylbenzene charge stock, existing below the reaction temperature with steam also existing below the reaction temperature, heating the resultant mixture to the desired reaction temperature and introduce the mixture into the dehydrogenation reaction zone. Other similar prior art processes admix the ethylbenzene with steam which has been super-heated to a temperature above the reaction temperature in a proportion to produce a resultant hydrocarbon mixture with the desired initial reaction temperature. Further, these processes may employ a plurality of reaction zones with intermediate steam and/or ethylbenzene addition being effected between each zone. In addition, the aforementioned processes may dilute the ethylbenzene with a compound stable at dehydrogenation conditions such as benzene, toluene or xylene.

SUMMARY OF THE INVENTION

It is, therefore, an object of the present invention to provide an economical process for utilizing all of the alkylatable aromatic hydrocarbon originally passed to a process for producing an alkylated aromatic hydrocarbon having an alkenyl group containing at least two carbon atoms. More specifically, the principal object of the present invention is to provide an economical means for recovering the unalkylated aromatic hydrocarbons present within the purge withdrawn from the alkylation zone, as hereinbefore set forth, and returning said unalkylated aromatic to the alkylation zone reduced in paraffinic hydrocarbon content thus effecting a complete utilization of the unalkylated aromatic hydrocarbon.

In an embodiment, the invention herein described relates to a process for producing an alkenyl aromatic hydrocarbon having alkenyl group containing at least two carbon atoms which comprises the steps of: (a) alkylating an alkylatable aromatic hydrocarbon with an olefin-acting compound in an alkylation reaction zone; (b) separating, from the resultant alkylation zone effluent, a monoalkylated aromatic hydrocarbon stream and an unalkylated alkylatable aromatic hydrocarbon stream containing saturated hydrocarbons; (c) commingling said monoalkylated aromatic hydrocarbon stream with steam and dehydrogenating said monoalkylated aromatic in a dehydrogenation zone at dehydrogenation conditions; (d)

recycling at least a portion of said unalkylated aromatic hydrocarbon stream containing saturated hydrocarbons to said alkylation zone; (e) commingling another portion of said unalkylated aromatic stream with steam, and superheating the resultant mixture to a temperature above the dehydrogenation temperature of said monoalkylated aromatic; (f) commingling said superheated steam and hydrocarbon mixture with the monoalkylated aromatic hydrocarbon in an amount to provide a mixture having a temperature above the dehydrogenation temperature of said monoalkylated aromatic; (g) separating the resultant dehydrogenation reaction zone effluent to recover an alkylaromatic hydrocarbon having an alkenyl group containing at least two carbon atoms and said unalkylated alkylatable aromatic hydrocarbon reduced in saturated hydrocarbon content; and, (h) recycling said unalkylated aromatic hydrocarbon reduced in saturated hydrocarbon content to said alkylation reaction zone.

A specific embodiment involves a process wherein the aforesaid alkylatable aromatic hydrocarbon is benzene, the olefin-acting compound is ethylene, the monoalkylated aromatic hydrocarbon is ethylbenzene, the alkenylaromatic hydrocarbon is styrene and the benzene and steam mixture is heated to a temperature of from about 1000° F. to about 1800° F. in a weight ratio of less than 1 part total hydrocarbon to 4 parts steam.

In summary, a principal advantage of our invention resides in an economical means for recovering the unalkylated aromatic hydrocarbon withdrawn as a purge from the alkylation section of an aromatic alkylation-dehydrogenation process, by passing said saturate containing aromatic to the steam superheater within the dehydrogenation zone. This results in a greater proportion of the alkylatable aromatic hydrocarbon being available for ultimate conversion to an alkenyl aromatic hydrocarbon than has been obtained in prior art processes.

DESCRIPTION OF THE DRAWING

This invention can be most clearly described and illustrated by reference to the attached drawing schematically illustrating the production of styrene from ethylene and benzene. Of necessity, certain limitations must be present in the schematic diagram of the type presented and no intention is made thereby to limit the scope of this invention as to reactants, rates, operating conditions, catalysts, etc. Miscellaneous appurtenances including valves, controls, pumps, compressors, separators, reboilers, etc. have been eliminated. Only those vessels and lines necessary for a complete and clear understanding of the embodiment of this invention are included. Various modifications to the process variables as well as the process flow can be made by those possessing expertise in petroleum technology, particularly the art of hydrocarbon alkylation and dehydrogenation. Examples of such modifications include the installation of a plurality of dehydrogenation reactors in parallel or a plurality of reactors in series; namely, the effluent from one reactor being introduced into the next reactor with additional steam being added to each additional reactor.

With reference now to the accompanying drawing illustrating the production of styrene via the alkylation of benzene with ethylene to form ethylbenzene and the steam dehydrogenation of the ethylbenzene, the ethylene enters the process through line 1, being admixed with fresh feed benzene entering through line 2 and the recycle benzene entering through line 19, the source of which is hereinafter described, with resulting mixture passing through line 3 to alkylation reactor 4 containing an alkylation catalyst and maintained at alkylation conditions wherein the ethylene reacts with benzene to form ethylbenzene and polyethylbenzenes. Alkylation reactor 4 effluent passes via line 5, is commingled with transalkylation reactor 16 effluent entering in line 17 and is passed to flash chamber 6 wherein unreacted ethylene and other light hydrocarbons are removed via line 7 and a gaseous-free ethylbenzene containing liquid phase is removed via line 8 and passed to recycle benzene column 9.

From recycle benzene column 9, unalkylated benzene, containing saturated hydrocarbons such as butane, hexane, methylcyclopentane and cyclohexane is recovered overhead and removed via line 10, the major portion of which passes through line 10 and is commingled with benzene recovered from the dehydrogenation section via line 18, and forms recycle benzene in line 19 as hereinbefore described. The portion of the unreacted benzene not recycled via line 10 is removed as a purge through line 11 and commingled with steam entering through line 22 and passing to steam superheater 23 with the resultant mixture being heated therein to a temperature of about 1350–1600° F., typically cracking the saturated hydrocarbon but leaving the benzene intact. The higher boiling alkylaromatic compounds are removed from recycle benzene column 9 and passed to ethylbenzene column 13 via line 12.

From ethylbenzene column 13, higher boiling polyalkylated benzenes are removed as bottoms via line 15, commingled with fresh feed benzene entering from line 2 and/or recycle benzene entering from line 19 in line 20, and passed via line 20 to transalkylation reactor 16 wherein the polyalkylated benzenes are transalkylated with benzene in the presence of a transalkylation catalyst at transalkylation conditions to produce ethylbenzene. The effluent of transalkylation reactor 16 passes via line 17 and is commingled with alkylation reactor 4 effluent as hereinbefore set forth.

Ethylbenzene is removed overhead from ethylbenzene column 13 via line 14 and is admixed with recycle-ethylbenzene, the source of which is hereafter described, entering via line 39, and steam condensate (water) entering via line 44. The resultant mixture is passed via line 14, heat-exchanged against dehydrogenation reactor 25 effluent in heat exchanger 21, to a temperature of about 1000° F., commingled with superheated steam from steam superheater 23, the source of which was hereinbefore set forth, in a proportion to provide a total mixture having a temperature of 1140° F., and the total mixture is passed via line 24 to dehydrogenation reactor 25.

Within dehydrogenation reactor 25, the ethylbenzene is dehydrogenated to styrene at dehydrogenating conditions in the presence of a dehydrogenation catalyst with the necessary heat for the endothermic reaction being supplied by the superheated steam. The resultant reactor effluent exits via line 26 at a temperature of about 1040° F., is heat-exchanged against incoming ethylbenzene in heat exchanger 21, as hereinbefore set forth, quenched to ambient temperature by means not shown, supplied to separator 27 wherein steam condensate is separated and discharged via line 29, vent gases including hydrogen, carbon monoxide and dioxide, ethane, ethylene, propane, butane, etc., via line 28 and a styrene-containing hydrocarbon mixture via line 30.

Said styrene-containing mixture is passed through line 30 to benzene-toluene fractionation column 31 wherein a benzene-toluene mixture is removed overhead via line 32 and is passed through clay tower 33 to remove trace quantities of styrene or olefinic hydrocarbons. Clay tower 33 effluent is passed through line 34 to benzene column 35 therein benzene formed within the dehydrogenation reaction and the benzene withdrawn from the alkylation zone recycle is recovered overhead substantially free from saturated hydrocarbons and is passed via line 18 wherein it is combined with recycle benzene line 19 within the alkylation zone as hereinbefore set forth. Toluene formed within the dehyrogenation reaction zone is removed as bottoms from benzene-toluene column 35 via line 36.

The bottoms of benzene-toluene column 31 containing ethylbenzene and styrene are removed via line 37 and passed to recycle ethylbenzene column 38 wherein ethylbenzene is recovered overhead and passed through line 39 and combined as hereinbefore set forth with ethylbenzene from the alkylation section. Recycle ethylbenzene column 38 bottoms are removed and passed via line 40 to styrene column 41 wherein substantially pure styrene is recovered overhead via line 43 and the small amount of tars formed within the dehydrogenation reaction are removed via line 42.

DESCRIPTION OF THE PREFERRED EMBODIMENTS

The alkylatable aromatic hydrocarbons suitable for use in the present process are many, with the monocyclic aromatic hydrocarbons being preferred. Suitable aromatic hydrocarbons include benzene, toluene, the xylenes, the trimethylbenzenes, the propyl benzenes, etc., and mixtures thereof. Higher molecular weight alkylaromatic hydrocarbons such as detergent intermediates formed by the alkylation of aromatics with olefins are also included. Typical of such materials are the hexylbenzenes, nonylbenzenes, dodecylbenzenes, hexyltoluenes, etc. Examples of other alkylatable aromatic hydrocarbons applicable are those containing condensed aromatic rings such as the alkyl naphthalenes, the alkyl anthracenes, etc., and the alkyl aromatic hydrocarbons with two or more aryl groups such as the alkyl substituted fluorenes, the alkyl substituted stilbenes, etc. Of the foregoing, benzene is especially preferred.

The olefin-acting compounds included not only the mono-olefins, diolefins, polyolefins, and acetylenic hydrocarbons, but also alcohols, ethers, esters, alkyl halides, alkyl sulfates, and alkyl phosphates. The preferred olefin-acting compounds are the mono- and poly-olefins existing either normally as gases or liquid. Preferred mono-olefins include ethylene, propylene, the butenes, the pentenes, hexenes, etc., and mixtures thereof. Cyclo-olefins such as cyclopentene, methylcyclopentene, cyclohexene, etc. may also be utilized. These olefins can exist not only as mixtures thereof but also when present in minor quantities in various gas streams, usually diluted with gases such as hydrogen, nitrogen, methane, ethane, propane, etc. Also included are substances capable of producing olefinic hydrocarbons under the conditions of operation utilized within the alkylation process such as the alkyl halides which undergo dehydrohalogenation to form olefinic hydrocarbons. Examples of such alkyl halides include ethyl fluoride, isopropyl fluoride, n-propyl fluoride, n-butyl fluoride, isobutylfluoride, ethyl chloride, isopropyl chloride, n-propyl chloride, n-butyl chloride, etc.

The particular alkylation reaction zone utilized within this invention is not critical to the invention. Of importance, is that said alkylation zone employ a recycle of the unalkylated alkylatable aromatic back to the alkylation reactor and/or transalkylation reactor, said recycle containing saturated hydrocarbons which, if not removed, will accumulate and act as a diluent within said reactor thus lowering the conversion per pass through the reactor. As used herein, the term unalkylated alkylatable aromatic refers to the hydrocarbon charged to the reaction zone which is not alkylated within the alkylation reaction and not to an aromatic which does not contain an alkyl group. For example, if toluene were to be alkylated with ethylene to form a methyl ethyl benzene, unreacted toluene would be referred to as an unalkylated alkylatable aromatic and methylethylbenzene would be referred to as a monoalkylated hydrocarbon. Such foregoing alkylation reactions typically utilize alkylation and transalkylation temperatures of about 0° C. to about 300° C. pressures of about atmospheric to about 200 atmospheres and liquid hourly space velocities based on unalkylated aromatic hydrocarbon of about .1 to about 20 hr. $^{-1}$. It is preferred that the alkylation and transalkylation reactions occur in the liquid phase. Examples of catalysts employed within such processes are aluminum chloride used alone or in conjunction with halides of the Friedel-Crafts type such as aluminum, zinc, iron or copper, hydrogen fluoride used alone or with a promoter such as boron trifluoride and/or ferrous fluoride, sulfuric acid, fluorosulfonic acid used alone or in conjunction with boron trifluoride, a boron halide used in conjunction with an alkali metal pyrophosphate, and a boron trifluoride modified substantially anhydrous gamma or theta alumina, silica magnesia, zirconia, alumina-boria, and silica alumina. Processes utilizing the foregoing conditions and catalysts are further exemplified in U.S. Pats. 3,200,164, 3,200,163, 3,131,230 and 3,126,421.

As hereinbefore set forth, the saturate level within the alkylation and/or transalkylation zone can be readily controlled by withdrawing a small portion of the unalkylated alkylatable hydrocarbon as a purge, and not returning it to the alkylation zone. The withdrawal of this aromatic stream functions to remove saturated hydrocarbons present within the aromatic stream and maintain the saturate level within the reactor at an acceptable level so as not to excessively dilute the reaction stream. Those saturates are compounds existing as trace quantities within the fresh reactor charge and those formed within the reaction itself which are not readily removed economically by conventional processing techniques. For example, in the alkylation of benzene with ethylene or propylene to form ethylbenzene or cumene respectively, such saturates may be normal hexane, or its isomers, methyl cyclopentane, and cyclohexane, or, in the alkylation of toluene with ethylene to form methylethylbenzene, such saturates include methyl cyclohexane, normal hexane and its isomers.

The dehydrogenation reaction zone to be utilized within the scope of this invention is to be of the steam-dehydrogenation type wherein there is a steam superheater capable of superheating steam to a temperature of about 1000° F. to about 1800° F., preferably above 1200° F., at a pressure from about atmospheric to about 20 atmospheres. The aforesaid dehydrogenation zone preferably encompasses a catalytic reactor but is not to be unduly limited to the utilization of a particular concentration of components. Catalysts preferably employed are the alkali-promoted iron catalysts of the type commonly known as "Shell 105" or "Shell 205." Such catalysts may consist essentially of 85.0% by weight ferric oxide, 2.0% by weight chromia, 12.0% by weight potassium hydroxide, and 1.0% by weight sodium hydroxide, or 90.0% by weight iron oxide, 4.0% by weight of chromia and 6.0% by weight of potassium carbonate. Other known dehydrogenation catalysts which may be employed include iron oxides, potassium oxide, other metal oxides and/or sulfides including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Dehydrogenation conditions are a function of the alkyl aromatic being dehydrogenated but generally include temperatures of about 500° C. to about 700° C., pressures of about atmospheric to about 5 atmospheres weight hourly space velocities based on hydrocarbon charge of from about .1 hr.$^{-1}$ to about 5 hr.$^{-1}$, and steam to hydrocarbon weight ratios of from about 1:1 to about 30:1.

The unalkylated aromatic hydrocarbon withdrawn from the alkylation zone is recovered by commingling the aromatic saturate mixture with steam, preferably at a weight ratio of less than 1 part total hydrocarbon to 4 parts steam, and passing the resultant mixture to the aforementioned steam superheater wherein the saturated hydrocarbons are cracked because of the high temperature present but the more stable alkylatable aromatic remains substantially intact. Recovered are alkylatable aromatics substantially free from saturated hydrocarbons wherein at least half of the supplied saturates have been decomposed. This superheated steam-hydrocarbon mixture is utilized in providing the heat necessary for the endothermic dehydrogenation reaction in whole or in part, by combining the mixture with the alkyl aromatic hydrocarbons passed to the reactor, by addition to intermediate points within the reactor and/or by interstage mixing where the dehydrogenation reactors are used in series.

From the foregoing, it is readily ascertainable that the process of this invention can encompass a variety of dehydrogenation schemes familiar to those trained in the dehydrogenation art. Included are those schemes utilizing a steam superheater as hereinbefore described, such as those processes utilizing steam above the dehydrogenation temperature to supply heat to either the reactor feed and/or the inter-reactor effluent where such reactors are utilized in series. Essential features of the process of the present invention, employed to effect a complete utilization of the alkylatable aromatic hydrocarbon feed to a combination alkylation-dehydrogenation process, are that the saturate-containing unalkylated aromatic removed as a purge from the alkylation zone is passed to a steam superheater, heated preferably to a temperature over about 1200° F. wherein said saturates are cracked, with the aromatics remaining intact, and the resultant aromatic is recovered for recycle back to the alkylation zone. Furthermore, said temperature of the steam superheater is at a temperature greater than the dehydrogenation temperature of the alkylated aromatic hydrocarbon being dehydrogenated.

The following example is given for the purpose of further illustrating the method of effecting the process of this invention and to indicate the benefits to be afforded through the utilization thereof. As previously stated, in regard to the description of the accompanying drawing, this example is not intended to unduly limit the present invention as to operation conditions, concentrations, reactants, catalysts, etc.

EXAMPLE

This example is indicative of a commercial process for producing approximately 155 million pounds per year of polymer-grade styrene from essentially pure ethylene and benzene. The alkylation zone contains two fixed-bed catalytic reactors, an alkylation reactor operating at 2.5 liquid hourly space velocity, 270° F. and 480 p.s.i.g., and a transalkylation reactor operating at 300° F., 480 p.s.i.g., and 1.5 liquid hourly space velocity. The catalysts employed in both reactors comprise a mixture of boron trifluoride and boron trifluoride-modified substantally anhydrous alumina. The dehydrogenation zone contains three fixed bed dehydrogenation reactors in parallel containing "Shell 105" catalysts, each supplied with two intermediate steam addition points to maintain the necessary dehydrogenation temperature of 1140° F. Each reactor operates at 0.25 overall weight hourly space velocity, an inlet temperature of 1140° F. and an inlet pressure of 11 p.s.i.g.

On a pound per hour basis, 16,500 pounds of fresh feed benzene are combined with 5,900 pounds of ethylene and 32,800 pounds of recycle-saturate benzene mixture containing 1,485 pounds of saturated hydrocarbons, the resulting mixture being passed to the beforementioned alkylation reactor. In addition, 41,100 pounds of the same saturated hydrocarbon-containing recycle benzene stream are combined with 17,200 lbs. of polyethylbenzenes and passed to the aforementioned transalkylation reactor. From the resulting reactor effluents, polyalkylated benzenes, recycle benzene containing saturated hydrocarbons and 22,100 pounds of ethylbenzene are recovered. In addition, 173 pounds of a saturate-containing benzene stream of the composition presented in the following table is withdrawn as a control on the saturate level within the alkylation zone.

This saturate-containing benzene stream is combined with 26,037 pounds of 470° F., 11 pounds per square inch steam and heated in a steam superheater to a temperature of 1465° F. at 11 pounds per square inch gauge. The resulting steam superheater effluent contains 26,035 pounds of steam and 175 pounds of reaction products of the composition presented also in the following table:

TABLE

| Component | Stream as withdrawn from alkylation zone, weight percent | Resultant effluent from steam superheaters, steam free basis, weight percent |
|---|---|---|
| Hydrogen | | .33 |
| Carbon monoxide | | .63 |
| Carbon dioxide | | .67 |
| Methane | | 1.23 |
| Ethylene | | 3.07 |
| Propylene | | .91 |
| Total $C_4$'s | 3.00 | 2.44 |
| Total $C_5$'s | | .37 |
| $C_6$ aliphatics | 2.22 | .21 |
| Methylcyclopentane | 2.17 | .21 |
| Cyclohexane | 2.17 | .21 |
| Benzene | 90.44 | 88.74 |
| Biphenyl | | .98 |

The 22,100 pounds of ethylbenzene produced within the alkylation zone is combined with 14,700 pounds of recycle ethylbenzene and 19,700 pounds of steam condensate with the resultant mixture being heat-exchanged with the dehydrogenation reaction product effluent to produce a mixture temperature of 1005° F. This heated mixture is then admixed with the 26,035 pounds of 1465° F. superheated steam-hydrocarbon mixture, the temperature of the final mixture being 1140° F. The resultant final steam-ethylbenzene-benzene mixture is passed to the hydrogenation reaction zone wherein 64,000 pounds of 1450° F. steam is continuously added to maintain dehydrogenation conditions within the dehydrogenation reaction zone.

The dehydrogenation reaction product, exiting at a temperature of 1110° F., is heat-exchanged against the incoming dehydrogenation reaction feed as hereinbefore described, exiting from the heat-exchangers at a temperature of 450° F., and is subjected to a rapid water quench to decrease the temperature to about 220° F. with subsequent cooling to about 100° F. This procedure inhibits the polymerization of styrene which would otherwise be formed if the product effluent would be cooled slowly from 450° F. to 100° F.

The resultant cooled dehydrogenation reactor effluent is passed to a suitable separation zone, removing therefrom $C_5$ and lighter vaporous hydrocarbon, condensed steam and a liquid hydrocarbon stream containing styrene, unreacted ethylbenzene and benzene. This liquid hydrocarbon stream is separated, recovering therefrom 19,500 pounds of product styrene, recycle ethylbenzene and 1,840 pounds of a benzene-toluene mixture. Within this benzene-toluene mixture is the benzene originally passed to the steam superheaters as well as the benzene and toluene produced within the dehydrogenation reactor by the decomposition of styrene and ethylbenzene.

This benzene-toluene stream is clay treated to stabilize the product and remove trace olefinic impurities and is then separated recovering therefrom 991 pounds of benzene, 1.1 pounds of trace saturated hydrocarbons and 848 pounds of toluene. This 991 pounds of benzene is composed of 155 pounds of the original 156 pounds of benzene originally passed to the steam superheaters and 835 pounds of benzene produced within the dehydrogenation reactor by the decomposition of styrene and ethylbenzene. The 1.1 pounds of trace saturated hydrocarbons represent the $C_6$ aliphatics, methylcyclopentane and cyclohexane remaining of the original 17 pounds of saturates passed to the steam superheater. The other saturates were cracked and/or removed in the aforementioned vaporous stream separated from the cooled dehydrogenation reactor effluent. These trace hydrocarbons are recycled along with the 991 pounds of benzene back to the alkylation zone in an amount much reduced from the amount present within the alkylation zone recycle, thus effecting an efficient control on the saturate level within the alkylation zone.

From the foregoing example, the direct, definite, and beneficial effects of the process of this invention are readily apparent. This process produced about 19,500 pounds of styrene from 16,500 pounds of benzene or 1.18 pounds of styrene per pound of benzene. Prior art process not utilizing the benzene withdrawn as a saturate control for the alkylation zone in styrene production must replace the benzene or suffer decreased styrene production since for each pound of benzene removed and not replaced there is a 1.18 pound ultimate styrene loss.

In the process of this invention hereinbefore exemplified, 155 pounds per hour of the 156 pounds per hour removed from the alkylation zone are recovered in the dehydrogenation zone and recycled back to the alkylation zone. This reflects a production of 183 pounds per hour of styrene or 1,450,000 pounds on a yearly production basis, an admittedly significant amount not readily obtainable in prior art processes. If this amount were not recovered and in order to maintain the given styrene production, 155 pounds per hour of 1,230,000 pounds per year of benzene must be added to the fresh feed benzene in the alkylation zone. Thus, the foregoing specification and example clearly indicate the method by which the process of this invention is effected and the benefits afforded through the use thereof.

I claim as my invention:

1. A process for producing an alkenyl aromatic hydrocarbon having an alkenyl group containing at least two carbon atoms, which comprises the steps of:
    (a) alkylating an alkylatable aromatic hydrocarbon with an olefin-acting compound in an alkylation reaction zone:
    (b) separating, from the resultant alkylation zone effluent, a mono-alkylated aromatic hydrocarbon stream and an unalkylated alkylatable aromatic hydrocarbon stream containing saturated hydrocarbons:
    (c) commingling said monoalkylated aromatic hydrocarbon stream with steam and dehydrogenating said monoalkylated aromatic in a dehydrogenation zone at dehydrogenation conditions;
    (d) recycling at least a portion of said unalkylated aromatic hydrocarbon stream containing saturated hydrocarbons to said alkylation zone;
    (e) commingling another portion of said unalkylated aromatic stream with stream and superheating the resultant mixture to a temperature above the dehydrogenation temperature of said monoalkylated aromatic;
    (f) commingling said superheated steam and hydrocarbon mixture with the monoalkylated aromatic hydrocarbon in an amount to provide a mixture having a temperature above the dehydrogenation temperature of said monoalkylated aromatic;
    (g) separating the resultant dehydrogenation reaction zone effluent to recover an alkenyl aromatic hydrocarbon having an alkenyl group containing at least two carbon atoms and said unalkylated alkylatable aromatic hydrocarbon reduced in saturated hydrocarbon content; and,
    (h) recycling said unalkylated aromatic hydrocarbon to said alkylation reaction zone.

2. The process of claim 1 further characterized in that said unalkylated aromatic hydrocarbon stream containing saturated hydrocarbons and steam are commingled in a weight ratio of less than about 1 part total hydrocarbon to 4 parts steam.

3. The process of claim 1 further characterized in that said alkylatable aromatic hydrocarbon is benzene, said olefin-acting compound is ethylene, said monoalkylated aromatic hydrocarbon is ethylbenzene, said alkenyl aromatic is styrene, and said unalkylated alkylatable hydrocarbon and steam mixture is heated to a temperature of from about 1000° F. to about 1600° F.

References Cited

UNITED STATES PATENTS

| 3,408,264 | 10/1968 | Ward | 260—669 XR |
| 3,408,265 | 10/1968 | Ward | 260—669 XR |
| 3,408,266 | 10/1968 | Ward | 260—669 XR |

DELBERT E. GANTZ, Primary Examiner

C. R. DAVIS, Assistant Examiner

U.S. Cl. X.R.

260—671